United States Patent [19]
Roth

[11] Patent Number: 5,339,367
[45] Date of Patent: Aug. 16, 1994

[54] IDENTIFYING CURVES WITHIN A SCANNED IMAGE

[75] Inventor: Gerhard Roth, Gloucester, Canada

[73] Assignee: National Research Council of Canada, Ottawa, Canada

[21] Appl. No.: 984,501

[22] Filed: Dec. 2, 1992

[51] Int. Cl.$^5$ .............................................. G06K 9/48
[52] U.S. Cl. ........................................ 382/22; 382/41; 382/60
[58] Field of Search ................... 382/22, 1, 54, 55, 41, 382/60, 25

[56] References Cited

U.S. PATENT DOCUMENTS

| | | | |
|---|---|---|---|
| 4,618,989 | 10/1986 | Tsukune et al. | 382/22 |
| 4,644,583 | 2/1987 | Watanabe et al. | 382/22 |
| 4,771,474 | 9/1988 | Takashima et al. | 382/22 |
| 4,868,884 | 9/1989 | Miyazaki et al. | 382/22 |
| 4,949,281 | 8/1990 | Hillenbrand et al. | 382/22 |
| 5,091,976 | 2/1992 | Murayama | 382/22 |
| 5,093,870 | 3/1992 | Watanabe | 382/54 |

OTHER PUBLICATIONS

Bolles et al. "A Ransac-Based Approach to Model Fitting and Its Application to Finding Clyinders in Range Data", Proc. of the 7th Joint Conf. of A.I., Aug. 24-28, 1981.

*Primary Examiner*—Joseph Mancuso

[57] ABSTRACT

A method is provided for identifying and locating curves within a digitized image. Digitized images are comprised of points which may represent curves stored as an array of binary coded elements in an memory device. Each addressable memory location in the array represents a single point or pixel. Particular curves within a scanned image are identified by randomly selecting a minimal subset of points which are necessary to generate a general equation for that curve; the equation along with a point on the curve is then used as in input parameter to an incremental curve generation routine which incrementally generates all points which are in a path along that curve. A comparison is made with scanned data to determine how many points exist along the path. This is repeatedly done until the curve with the greatest number of points is located.

9 Claims, 2 Drawing Sheets

IDENTIFYING CURVES WITHIN A SCANNED IMAGE

FIELD OF THE INVENTION

This invention relates generally to the art of information storage and retrieval with specific emphasis on the retrieval aspects. More particularly, the invention relates to identifying particular images stored within a memory array.

BACKGROUND OF THE INVENTION

Curve extraction is a process of identifying geometric curves in sensor data. Sensor data is understood to mean herein an amount of information which is derived from an object and which is regularly arranged according to two coordinates. The information may have been derived by means of optical means or other means, such as a scanning electron microscope or radio-telescope. A geometric curve is a curve which has an associated equation, such as a line, circle, or an ellipse. Extracting or identifying geometric curves is a particularly useful task in the field of model-based vision. Practical applications of the process of finding curves in data are numerous. For example, a robot can be guided by identifying curves representing objects within an associated camera's field of view. An image scanned by the camera may be processed by a computer to locate curves such as the outline of a fluorescent light on the ceiling along a desired path of the robot's travel. The robot may then re-orient itself according to the reference co-ordinates of the edge data representing the fluorescent light or other located curve.

A scanned image may include two dimensional (2D) curves, such as lines, circles, parabolas and ellipses in the form of sensor data. Sensor data generally consists of points on a 2D array. These points are most often stored in the form of binary data however other coding schemes yielding decodable indicia may be used to represent the points. The binary data sometimes referred to as edge data is produced by processing an intensity image using edge detection, followed by thresholding to produce a binary edge map of edge points or edge data. Thresholding is a well known concept and is described in U.S. Pat. No. 4,644,583 in the name of Watanabe et al.

Many methods currently exist for finding curves within edge data. In general the primary factors affecting performance are: the duration of time required to match a curve with the relevant data, and, the space required to store data. In the past, the most widely used approach to extract or locate curves has been the Hough transform (HT) disclosed by D. Ballard and C. Brown, in a book entitled Computer Vision, published by Prentice Hall, 1992. Ballard discloses the basic principle of operation. Each edge point votes for all parameter combinations that could have produced it. This voting process requires that the parameter space be partitioned into cells (usually rectangular) by quantizing each of the dimensions of this space; then each edge point adds a single vote to all the cells whose combination of parameters could have produced a geometric curve through that point. An individual cell in a parameter space thus describes the edge points covered by all the geometric curves whose parameter vectors are contained in the cell. These points taken together define a template of the same approximate shape as the curve, whose size is determined by the cell size. When this template is applied to the data it returns the same set of points that voted for the cell in the standard HT algorithm. Thus, the HT is a space inefficient method of performing template matching. If there are N edge points, then for each of these points the voting process must mark the appropriate cell in the parameter space. Thus, the execution time for the HT s clearly proportional to N, the number of edge points in the array.

G. Roth and M. D. Levine disclose another method for finding curves in a paper entitled "A Genetic Algorithm for Primitive Extraction", published in the Proceedings of the Fourth International Conference on Genetic Algorithms, (San Diego), pp. 487–494, July 1991. However, as with many other methods, the most inefficient and computationally expensive method step is the step of matching a potential geometric curve against the sensor data. This matching process yields the number of points within a small template centered on the curve. This process is repeated a number of times, and the curve with the greatest number of points is located.

In a paper entitled, "A Ransac-Based Approach to Model Fitting And Its Application To Finding Cylinders In Range Data", published in Proceedings of the Seventh International Joint Conference on Artificial Intelligence, Volume II IJCAI 1981 24th–28th August, University of British Columbia Robert C. Bolles and Martin A. Fischler disclose another example of a method for finding curves. In particular, a method for finding ellipses in sensor data is disclosed. The method includes the steps of iteratively selecting sets of five points; computing the general second-order equation of the curve that passes through the points; and then determining whether or not the result is an ellipse that has approximately the right minor diameter and comes close to a sufficiently large number of the points. If these conditions are satisfied, the parameter values are used, and if not, another set of five points are used. The step of determining whether or not the result is an ellipse having a sufficiently large number of points is performed by evaluating residuals. Residuals are defined to be the errors of fit. In order to evaluate the residuals, the data in all the non-zero memory locations in the array are read. As a result, this time-consuming process of reading all the data in the array greatly increases the time required to locate a particular curve.

In the field of computer graphics, and more specifically, for the purpose of drawing curves on a computer display terminal, methods are known to perform the step of determining where all the points on a curve will be drawn on the screen or placed on an addressable array, given the equation of the curve and a points on the curve as a general input parameter. One such method commonly used for this drawing function is the "incremental method of curve generation". The general steps are as follows: a curve is generated from a point of origin up to a final point by the calculating of the elementary movement at each step which will determine the following point from the current point. At each step, the elementary movement can be calculated either using implicit methods, arithmetic methods, or structural properties. Incremental methods make use above all of integral arithmetic and generally avoid the use of multiplication and division operations.

Paul S. Heckbert in an article entitled Digital Line Drawing in a book entitled Graphics Gems, 1990, Academic Press, presents a practical implementation for Bresenham's algorithm (1965) for incremental curve generation of straight lines. Gérard Hégron in a book entitled Image Synthesis published by the MIT Press of Cambridge Massachusetts discloses several incremental curve generation algorithms, and more specifically Hégron discloses methods which generalizes Bresenham's algorithm to generate curves such as circles, parabolas and ellipses by incremental methods.

It has been found however, on such devices as display terminals and laser printers, that standard thin lines generated by incremental curve generation algorithms, have in some cases, been found to be too thin and not desirable. One solution to this problem in the graphics and computer arts is disclosed by Bob Wallis in an article entitled "Rendering Fat Lines on a Raster Grid" in a book entitled Graphics Gems, edited by Andrew S. Glassner and published by Academic Press 1990. Wallis discloses a method for rendering multi-pixel wide lines on a raster grid which overcomes the limitation of Bresenham's method and other incremental methods. In combination, the incremental curve generation method and the method disclosed by Wallis for rendering fat lines provide the steps required to draw a curve of width w given an equation for the curve and points on the curve. Although these methods appear to work satisfactorily for their intended purpose, to date, they have been generally limited in the application to providing expedient ways of drawings curves and not for the purpose of locating curves in sensor data.

STATEMENT OF THE INVENTION

It is an object of the invention to provide an expedient method for locating curves within a digitized image.

In accordance with one aspect of the invention there is provided a method of identifying a curve represented by points, each of the points being stored in a binary form in a unique, addressable location in a memory array, the method comprising the steps of sampling the binary data in the array to obtain a plurality of indicia corresponding to sampled points; generating an equation for a curve which intersects the sampled points; determining the location of all the addressable memory locations in the array which lie on a path of width w corresponding to the curve defined by the equation; determining the number of points in the array that lie within the path of width w; and, repeating the steps above and selecting the path with the greatest number of points.

In accordance with another aspect of the invention a method is provided for identifying a curve represented by points, each of the points being stored in a binary form in a unique, addressable location in a memory array, the method comprising the steps of: generating an equation for a curve; determining the location of all the addressable memory locations in the array which lie on a path of width w corresponding to the curve defined by the equation; determining the number of points in the array that lie within the path of width w; and, repeating the steps above and selecting the path with the greatest number of points.

In accordance with another aspect of the invention there is provided, a method of identifying a curve represented by a plurality of numbers, a difference in any two numbers representing a difference in the brightness in the array, each of the numbers being stored in an addressable location in a memory array, the method comprising the steps of generating an equation for a curve; determining the location of all the addressable memory locations in the array which lie on a path corresponding to the curve defined by the equation; summing the values of the differences in brightness of the points that lie within the path; and repeating the above steps and selecting the path with the greatest number of points.

In accordance with another aspect of the invention, there is provided a method of identifying a curve represented by a plurality of numbers, a difference in any two numbers representing a difference in the brightness in the array, each of the numbers being stored in an addressable location in a memory array, the method comprising the steps of: generating an equation for a curve; determining the location of all the addressable memory locations in the array which lie on a path of width w corresponding to the curve defined by the equation; determining the number of points in the array that lie within the path of width w; and, repeating the steps above and selecting the path with the greatest number of points.

In accordance with another aspect of the invention there is provided a method of identifying a curve represented by points, each of the points being stored in a binary form in a unique, addressable location of an array in a memory, comprising the steps of: sampling the binary data in the array to obtain a plurality of indicia corresponding to sampled points; generating an equation for a curve which intersects the sampled points; determining the number all the addressable memory locations in the array which lie on the curve defined by the equation, wherein the curve is of a predetermined width w; determining the number of points in the array that lie on the curve of width w; and, comparing the number in the last step with the number in the step preceding the last step.

Advantageously, by using incremental point generation routines to determine the number of all the addressable memory locations in the array which lie on the curve defined by the equation, the entire method of identifying curves is independent of the total number of edge points in the array and is dependent only on the ratio of the number of points on the curve and the total number of points in the array.

BRIEF DESCRIPTION OF THE DRAWINGS

Exemplary embodiments of the invention will be described in accordance with the invention in which.

DETAILED DESCRIPTION

Figure 1:
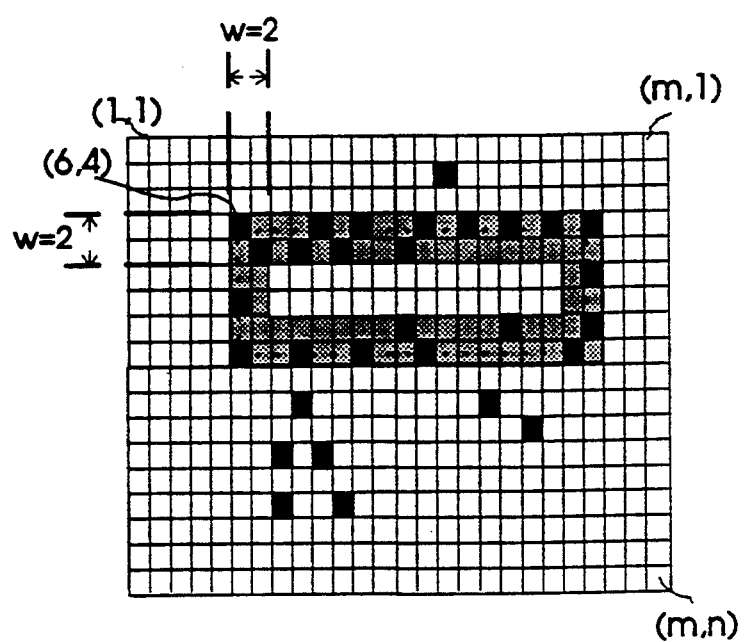
FIG. 1 is a binary coded array of edge points of a scanned image.

Referring to FIG. 1 a binary coded m×n array 10 is shown. Each entry of edge data within the array is stored as a binary value denoted graphically in FIG. 1 by a black square as indicated at location (6, 4). Each memory location in the m×n array has a unique address and any address can be read to yield a binary value stored at that particular address.

Generally, when an image is scanned, a rastered image of pixels is mapped to a binary array. The pixel values are thresholded such that those below a predetermined intensity are assigned one binary value and those equal to or above that predetermined intensity are assigned a binary value of the opposite sense. Alternatively, other coding schemes could be implemented.

For example, each array location could store a numerical value corresponding to the brightness level before thresholding. Of course some form of thresholding would have to eventually be applied in order to determine which data would be considered as valid edge data.

By way of example and for the purpose of illustration, a cross hatched area forming a rectangle is shown in the figure. Assuming that a rectangle of width w=2 is the target to be located, its would first be necessary to locate each of the four intersecting lines of width w=2 forming the rectangle. Since straight lines are each represented by an particular equation, to locate a line of width w=1 within an array of points, two points within the array are selected and an equation for that line is generated. Preferably the two points are selected by random sampling. Often, a small set of points on a curve is a good representation of the entire curve. This is trivially true for perfectly accurate data, and is less true as the accuracy of the data decreases. Thus, for this method to be applicable, the data should be reasonably accurate; the average error in the 2D edge data should not be more than a few points on the array. A minimal subset is the smallest set of points necessary to define a unique instance of a curve. For a line, a minimal subset has two points, since one point under constrains a line, and three points over constrains it. Similarly, the size of a minimal subset for a circle is three points, and for an ellipse is five points. It is clear that a curve passes through the points in a minimal subset exactly with no error of fit.

Most importantly, once all the points along a line have been generated, edge points within the array are compared to determine if they correspond to points defined to be along the line. This comparing step is generally referred to as matching the curve against the edge points. Of course, instead of generating an equation for a particular line given at least two points on that line as described above, an equation for a line having predetermined characteristics or a randomly generated equation could be used. After generating all the points along the line defined by this equation, these points would serve as a template to compare the edge points with.

In the past curve matching has been performed by computing the distance of each of the N edge points in the array from the curve, and then counting the number of points that are close enough. Since, N is often in the order of a few thousand edge points, the matching time can become excessive. While this time can be decreased by using parallel hardware, a simpler method, according to this invention, is preferred, using incremental curve generation routines to compute the list of points on the curve.

Once the location of all the points on a curve are known, the particular addresses of the points on the curve may be compared with the same addresses in the array of edge data to determine how many corresponding edge points exist.

In accordance with the invention, a computer program written in the "C" language is listed below which generates the addresses of array points on a line and counts the number of edge points which are on the line.

```
/*
 * Function: Line_Draw_Score          ;
 *
 *
 */
int Line_Draw_Score(FrameBuffer, x1, y1, y2)
char**FrameBuffer;
int x1, x2, y2;
{
    int d, x, y, ax, ay, sx, sy, dx, dy, Score;
    dx=x2-x1;   ax=ABS(dx)<<1;   sx=SGN(dx);
    dy=y2-y1;   ay=ABS(dy)<<1;   sy=SGN(dy);
    Score=0;    x=x1;             y=y1;
    if(ax>ay)   /*x dominant */
    {
        d=ay - (ax>>1);
        for (;;)
        {
            Score+=FrameBuffer[x][y];     /* Adds 0 (no effect) or 1 */
            if(x==x2) return(Score);
            if(d>=0)
            {
                y +=sy;
                d -=ax;
            }
            x +=sx;
            d +=ay;
        }
    }
    else        /* y dominant */
    {
        d=ax - (ay>>1);
        for (;;)
        {
            Score +=FrameBuffer[x][y];
            if(y==y2)return(Score);
            if(d>=0)
            {
                x +=sx;
                d -=ay;
            }
```

```
            y +=sy;
            d +=ax;
        }
    }
}
```

The computer program above, based on Bresenham's algorithm, requires two points on a line as input parameters x1, y1, x2, y2; During program execution, the addresses of all points on an array that define the line between the two points are incrementally generated. In effect, the these points are used as a template for comparing points in the same location within the array of interest containing the edge data. During program execution the addresses of all the points on the line are compared with the same addresses in the array containing edge data. The number of points on the array of interest which match and thus contain edge data are computed.

Alternatively, Bresenham's line generation algorithm may be modified in such a manner as to provide the points on a particular curve given the equation of the curve, or at least a minimal number of points required to define that curve. As was described heretofore, Gérard Hégron in a book entitled Image Synthesis discloses computer code for incrementally generating points on a curve.

Figure 2:
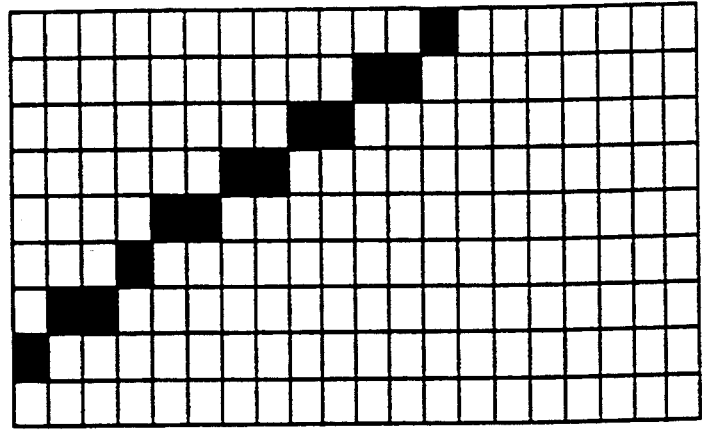
FIG. 2 is a portion of a binary coded array depicting some edge points of a line.
Figure 3:
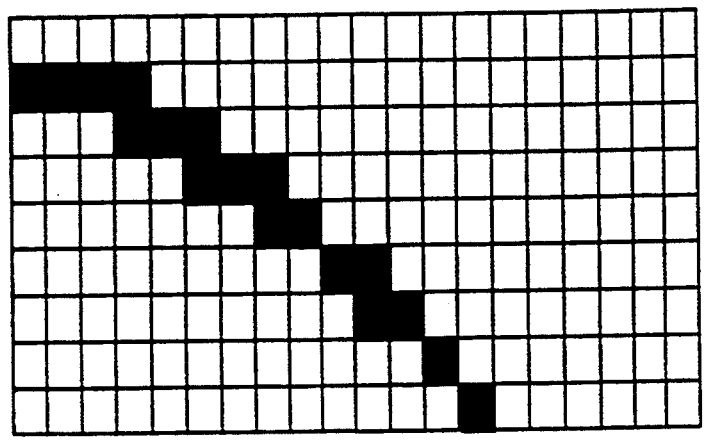
FIG. 3 is a portion of a binary coded array depicting some edge points of an arc of a circle.

Now, referring to FIGS. 2 and 3 two examples of the output of incremental curve generation routines are shown. In FIG. 2 edge data for a straight line is shown and in FIG. 3 edge data for an arc of a circle is shown. The method of this invention uses template matching by using such incremental curve generation routines to generate a template. The template however, is a list of addresses of points defining a curve. Instead of drawing the points on the curve, as is typically done, by any edge points that correspond to curve points defined by the incremental curve generation routine are counted. This produces the same result as counting the number of edge points within a given distance of the curve. By template matching in this fashion, the time taken to match edge points to the curve is proportional to the number of points on the generated curve. Thus the time takes to match the edge points to the curve is independent of N, the total number of edge points in the array.

Below is a method in accordance with the invention, of locating a curve which uses random sampling based on minimal subsets.

For K randomly chosen sets of R points.

1. Find the equation of a curve through a minimal subset of points and using the equation and the subset of points find all the points on the curve of using an incremental point generation method.

2. Match all the points of the curve generated by incremental point generation against the edge points which lie in the path of the curve.

3. Save information relating to the curve that matches the most edge points.

In the method above, R is the number of points in a minimal subset and K is the total number of minimal subsets.

After completing the steps K times, the curve containing the most edge points is located. By removing these match points, and repeating the process with the remaining edge points, all the curves can be found. Of course, K the number of minimal subsets necessary of successful extraction is far less than the maximum possible value.

The value of K depends on Y, minimum expected number of points on a single curve. If $\epsilon$ is the probability that a single randomly drawn point out of the N edge points is one of the Y points on the desired curve, the value $\epsilon$ is then equal to Y/N. The probability of all of R randomly drawn points of a single minimal subset being on the curve is therefore $\epsilon^R$. Let s be the probability that at least one of the K minimal subsets has all its R points on the is curve. Then s as a function of $\epsilon$, R, and K is:

$$s = 1 - (1 - \epsilon^R)^k$$

The valve of K as a function of $\epsilon$, s, and R is:

$$K = In(1-s)/In(1-\epsilon^R)$$

In order to have a high confidence of successful extraction, s is set to a large value (usually 0.95). The above equation is used to set the value of K accordingly. However, this is the worst case value for K; the expected value can be found by setting s equal to 0.5.

Of course the method according to the invention may be varied. Steps (1) and (2) above of generating and matching may be performed a predetermined number of times or may be performed repeadetly or until an acceptable results within a predetermined range is attained.

It should further be realized that numerous other embodiments may be considered without departing from the scope of the invention.

What I claim is:

1. A method of identifying a curve represented by points, each of the points being stored in a binary form in a unique, addressable location in a random access memory array, comprising the steps of:
   a) sampling the binary data in the random access memory array to obtain a plurality of sampled points;
   b) using a minimal subset of the sampled points as seed values for generating an equation for a curve that intersects the sampled points;
   c) determining the number of points in the random access memory array that lie on a path of a predetermined width w corresponding to the curve defined by the equation; and,
   d) repeating steps (a) to (c) and selecting the curve lying on the path of width w having the greatest number of corresponding points determined in step (c).

2. A method as defined in claim 1 wherein the sampling step is performed by randomly sampling the binary data.

3. A method as defined in claim 1 wherein the step of determining the location of all the addressable memory locations in the array which lie in a path of width w is performed by a method of incremental curve generation.

4. A method as defined in claim 1 wherein the plurality of samples is comprised of a number corresponding to a minimal number required to define an equation for a particular curve.

5. A method of identifying a curve represented by points, each of the points being stored in a binary form in a unique, addressable location in a memory array, comprising the steps of:
   a) generating an equation for a curve using a minimal subset of sampled points;
   b) determined the number of points in the random access memory array that lie on a path of a predetermined width w, corresponding to the curve defined by the equation; and
   c) repeating steps (a) to (b) and selecting the curve lying on the path of width w having the greatest number of corresponding points determined in step (b).

6. A method of identifying a curve represented by a plurality of numbers, a difference in any two numbers representing a difference in the brightness in the array, each of the numbers being stored in an addressable location in a random access memory array, the method comprising the steps of:
   a) generating an equation for a curve;
   b) determining the location of all the addressable memory locations in the random access memory array which lie on a path corresponding to the curve defined by the equation;
   c) summing the values of the differences in brightness of the points that lie within the path; and,
repeating steps (a) to (c) and selecting a curve defined by points stored in the random access memory corresponding to the the greatest summed value in step (c).

7. A method of identifying a curve represented by a plurality of numbers, a difference in any two numbers representing a difference in the brightness in the array, each of the numbers being stored in an addressable location in a random access memory array, the method comprising the steps of:
   a) generating an equation for a curve;
   b) determining the location of all the addressable memory locations in the random access memory array which lie on a path of width w corresponding to the curve defined by the equation, w being a predetermined number;
   c) determining the number of points in the array that lie within the path of width w; and,
repeating steps (a) to (c) and selecting the path with the greatest number of points.

8. A method of identifying a curve represented by points, each of the points being stored in a binary form in a unique, addressable location of a random access memory array, comprising the steps of:
   a) sampling the binary data in the random access memory array to obtain a plurality of indicia corresponding to sampled points;
   b) generating an equation for a curve which intersects the sampled points;
   c) determining the number all the addressable memory locations in the array which lie on the curve defined by the equation, wherein the curve is of a predetermined width w;
   d) determining the number of points in the random access memory array that lie on the curve of width w; and,
comparing the number in step (c) with the number in step (d).

9. A method as defined in claim 8 wherein the comparing in step (d) is done repeatedly until the ratio of the numbers compared are at least a predetermined number.

* * * * *